Figure 1:
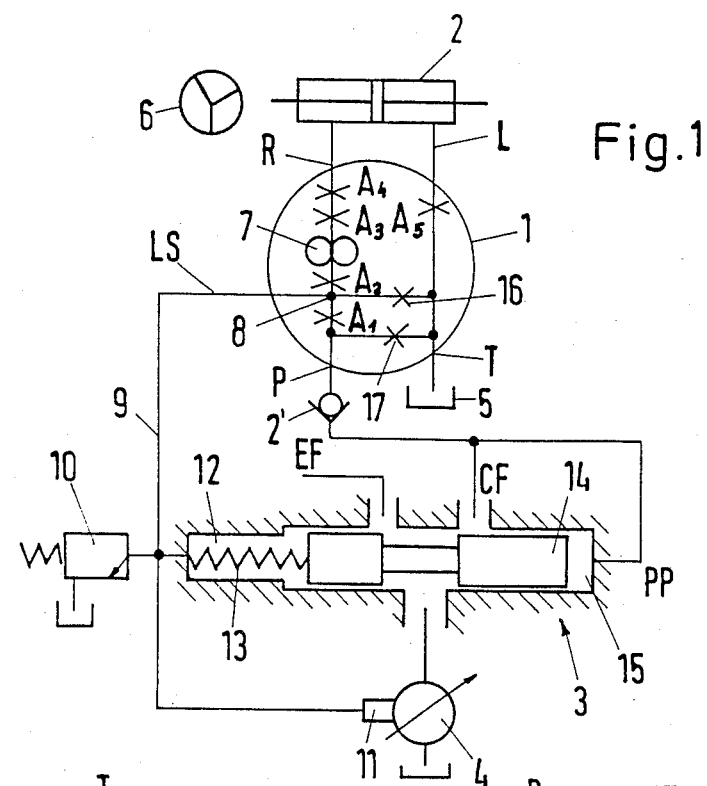

United States Patent [19]
Jorgensen

[11] Patent Number: 4,730,544
[45] Date of Patent: Mar. 15, 1988

[54] CONTROL DEVICE FOR HYDROSTATIC STEERING MEANS OR THE LIKE

[75] Inventor: Erik C. Jørgensen, Nordborg, Denmark

[73] Assignee: Danfoss A/S, Nordborg, Denmark

[21] Appl. No.: 95,144

[22] Filed: Sep. 11, 1987

[30] Foreign Application Priority Data

Oct. 16, 1986 [DE] Fed. Rep. of Germany ....... 3635162

[51] Int. Cl.$^4$ .............................................. F15B 9/08
[52] U.S. Cl. ........................................ 91/467; 60/384; 137/625.24
[58] Field of Search ............................ 60/384; 91/467; 137/625.24

[56] References Cited
U.S. PATENT DOCUMENTS 4,096,883 6/1978 Yip .............................. 137/625.24 X Primary Examiner—Gerald A. Michalsky
Attorney, Agent, or Firm—Wayne B. Easton

[57] ABSTRACT

The invention relates to a control device for a hydrostatic steering motor of the type having a slide valve arrangement in which inner and outer sleeves are rotatable relative to each other to both sides of a neutral position through a limited small angle. A bypass throttle between the pump and tank connections of the control device has a dual throttle feature which permits the throttle to be closed after only a small amount of turning away from the neutral position and operates with a reduced amount of noise generated during the turning operations for the same total resistance.

6 Claims, 8 Drawing Figures

CONTROL DEVICE FOR HYDROSTATIC STEERING MEANS OR THE LIKE

The invention relates to a control device for hydrostatic steering means or the like, comprising a rotatary slide valve arrangement of which the slide elements which are rotatable relatively to each other through a limited angle to both sides of a neutral position comprise control orifices which form at least a first throttle in the supply to the steering motor and a second throttle in the return from the steering motor, which throttles are closed in the neutral position, as well as a bypass throttle that is open in the neutral position and disposed between the connections on the pump side and container side.

A control device of this kind with a bypass throttle is known from U.S. Pat. No. 4,096,883. The rotary slide arrangement in that case comprises an outer and an inner sleeve. The control orifices are formed by the cross-sections of bores, grooves and the like disposed in the peripheral surfaces of the two sleeves. Behind the first throttle, a load pressure conduit branches off. The particular load pressure serves to control the pump pressure depending on the load and to control a priority valve.

The control device is substantially of the 'closed centre' type and differs from this only in that in the neutral position a quantity of pressure fluid limited by the bypass throttle, for example 5% of the maximum amount of throughflow, is passed through the control device.

The parts of the control device are thereby held at a suitable temperature. It is therefore not possible for jamming to occur when, as a result of starting operations after a prolonged cooling-off period, the slide valve arrangement heats up more rapidly than the housing. The steady flow through the control device has the additional advantage that the slide in the priority valve keeps the controlled orifice leading to the control device slightly open. The system is therefore immediately ready for regulation when the rotary slide valve arrangement of the control device is displaced out of the neutral position. There is therefore no lost motion which the customer experiences as an uncomfortable 'hard point' when turning the control device.

In the known case, the bypass throttle is constituted by two control orifices which are formed by the mouths of an oblique bore in the outer sleeve and a radial bore in the inner sleeve. Even in the neutral position there will be unpleasant noises. Since the drills required to form these bores must have a certain minimum diameter, the control orifices must have a comparatively large width in the circumferential direction. The bypass throttle is therefore still open when the first throttle in the supply to the steering motor has already opened. With the pump pressure controlled depending on the load, the load pressure therefore rises and, with it, the pump pressure as long as the bypass throttle is not yet closed. The higher pressure leads to loud noises.

The invention is based on the problem of providing a control device of the aforementioned kind in which less noise is generated.

This problem is solved according to the invention in that the bypass throttle has two throttle positions behind each other in that two control grooves mutually offset in the direction of rotation are interconnected in one slide element in the neutral position by a bridging space in the other slide element.

By locating the two throttle positions behind each other, there is a considerable reduction in noise for the same throttling resistance. The construction also permits the bypass throttle to be completely closed after turning it by a very small amount out of the neutral position. For this, it is only the width of the bridging space and the width of the web between the mutually offset control grooves that are decisive. It is therefore possible to effect closure before the first and possibly the second throttle are opened and the pump pressure rises. This likewise reduces the generation of noise. The production of the control grooves and the bridging space can be undertaken with high precision. If desired, the throttling resistance of the bypass throttle can also be increased so that, with a given pump pressure, the throughflow through the control device can be reduced.

If the rotary slide arrangement comprises an outer and an inner sleeve and the first throttle is formed by circumferentially offset bores in the outer sleeve and axial grooves separated by webs at the periphery of the inner sleeve, it is recommended that the control grooves of the bypass throttle be provided at the periphery of the inner sleeve and the first control groove extends in one of the webs. With this arrangement, no additional space is required for the most part of the first control groove. In the neutral position, a safe connection to the connection on the pump side is ensured through the bore associated with the web.

If the interior of the inner sleeve is connected to the connection on the container side, the second control groove of the bypass throttle should be formed by a slot through the inner sleeve. The slot establishes a direct connection to the connection on the container side.

An axially compact construction is obtained if the control grooves of the bypass throttle overlap one another. The bridging space can then be kept axially short.

It is particularly favourable if the bridging space is formed by a closed bore, particularly a blind hole. The latter can also be applied to the inner circumference of the outer sleeve if it is disposed near the end and is drilled slightly obliquely.

If a load pressure conduit branches off behind the first throttle and is in the neutral position connected to the connection on the container side by way of a relief throttle, it is recommended that the load pressure conduit should comprise an annular groove which is disposed at the periphery of the outer sleeve and communicates by way of bores with the longer axial grooves of the first throttle, that at least one axial groove should be shorter, that the second control groove of the bypass throttle should project up to between the longer axial grooves in the vicinity of the shorter axial groove and that the bridging space should be disposed substantially below the annular groove. In this way, it is possible to apply the bypass throttle so that practically no additional space is required.

In a further embodiment of the invention, the relief throttle comprises a control groove which is disposed at the periphery of the inner sleeve offset in the direction of rotation adjacent to a longer axial groove of the first throttle and axially overlaps the latter, the control groove and axial groove being interconnected in the neutral position by a bridging space at the inner circumference of the outer sleeve.

Figure 2:
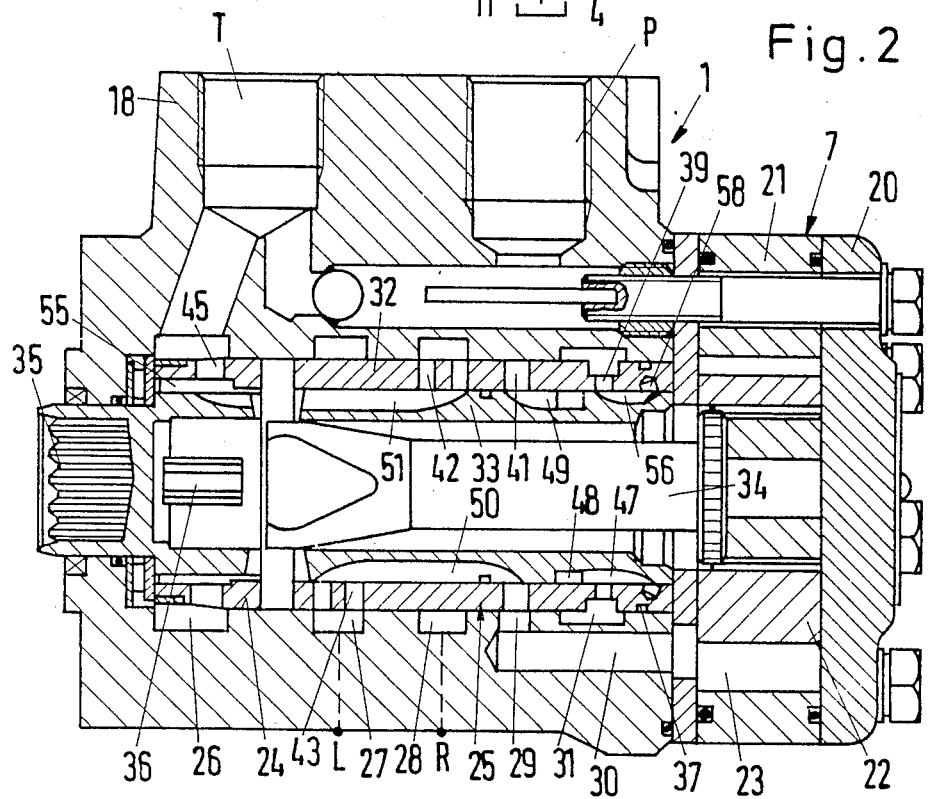
Figure 3:
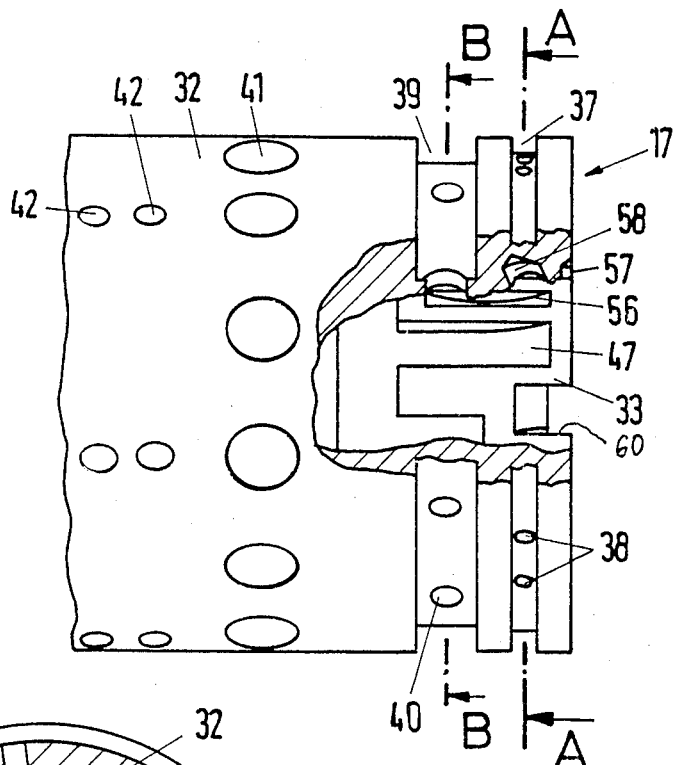
Figure 4:
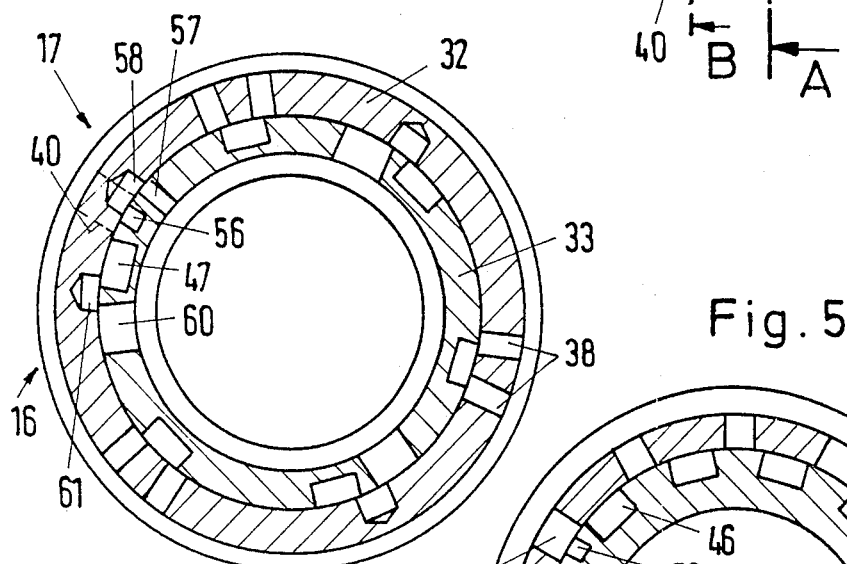
Figure 5:
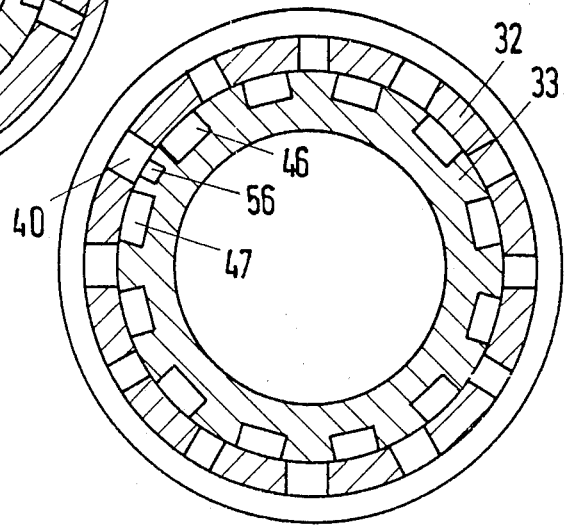
Figure 7:
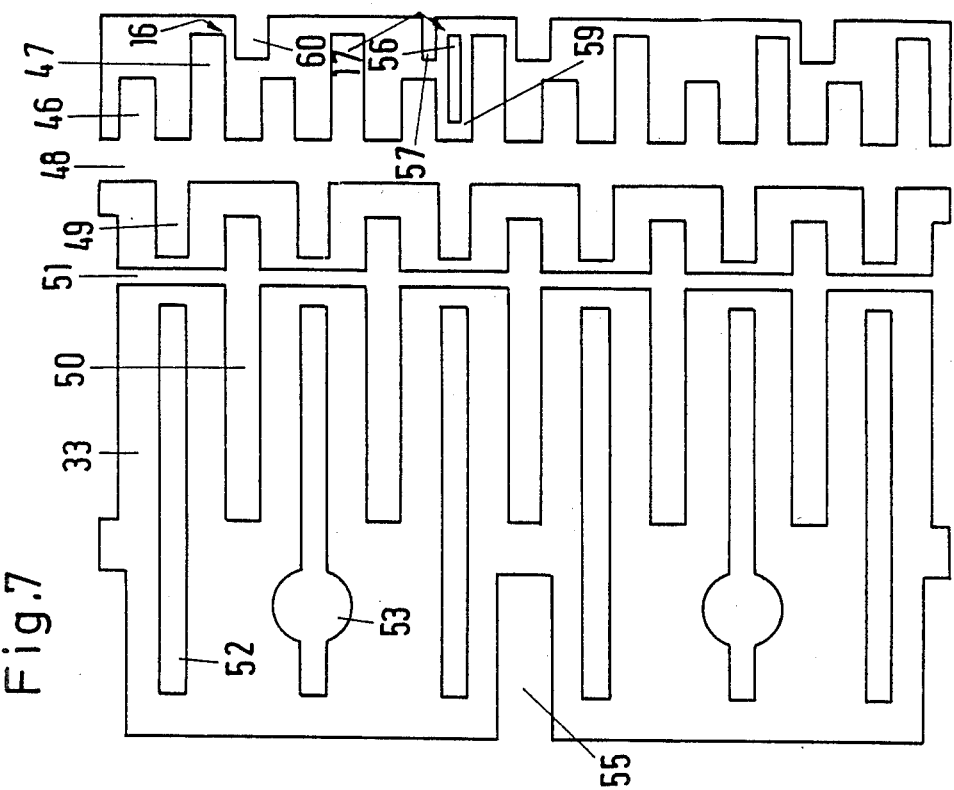
Figure 6:
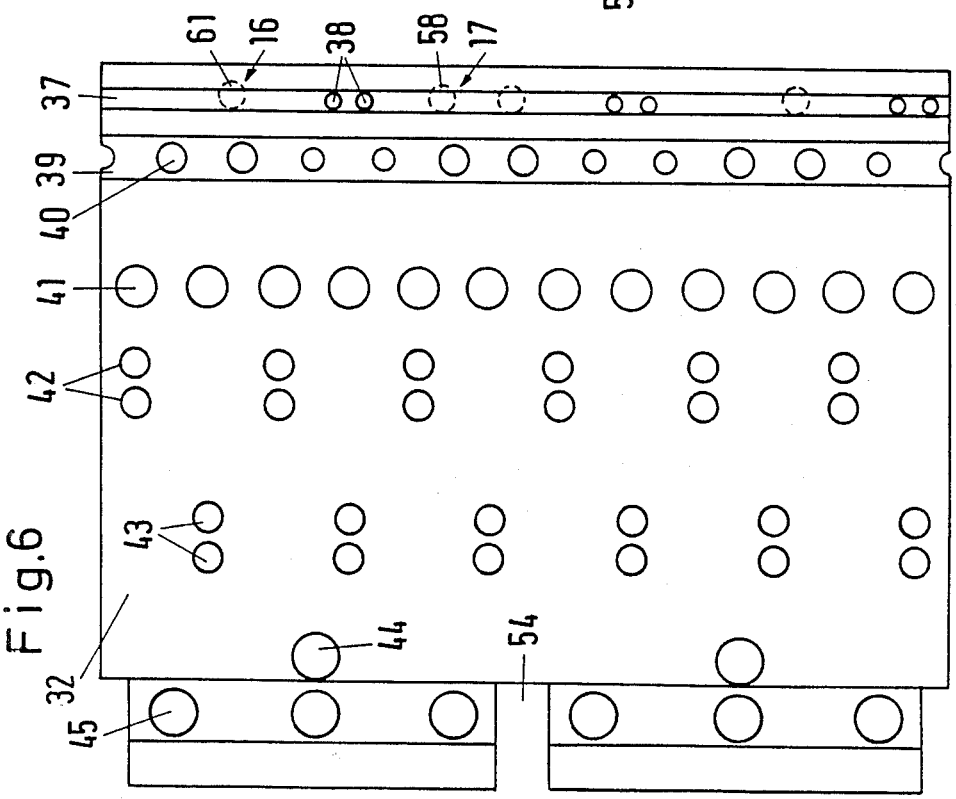
Figure 8:
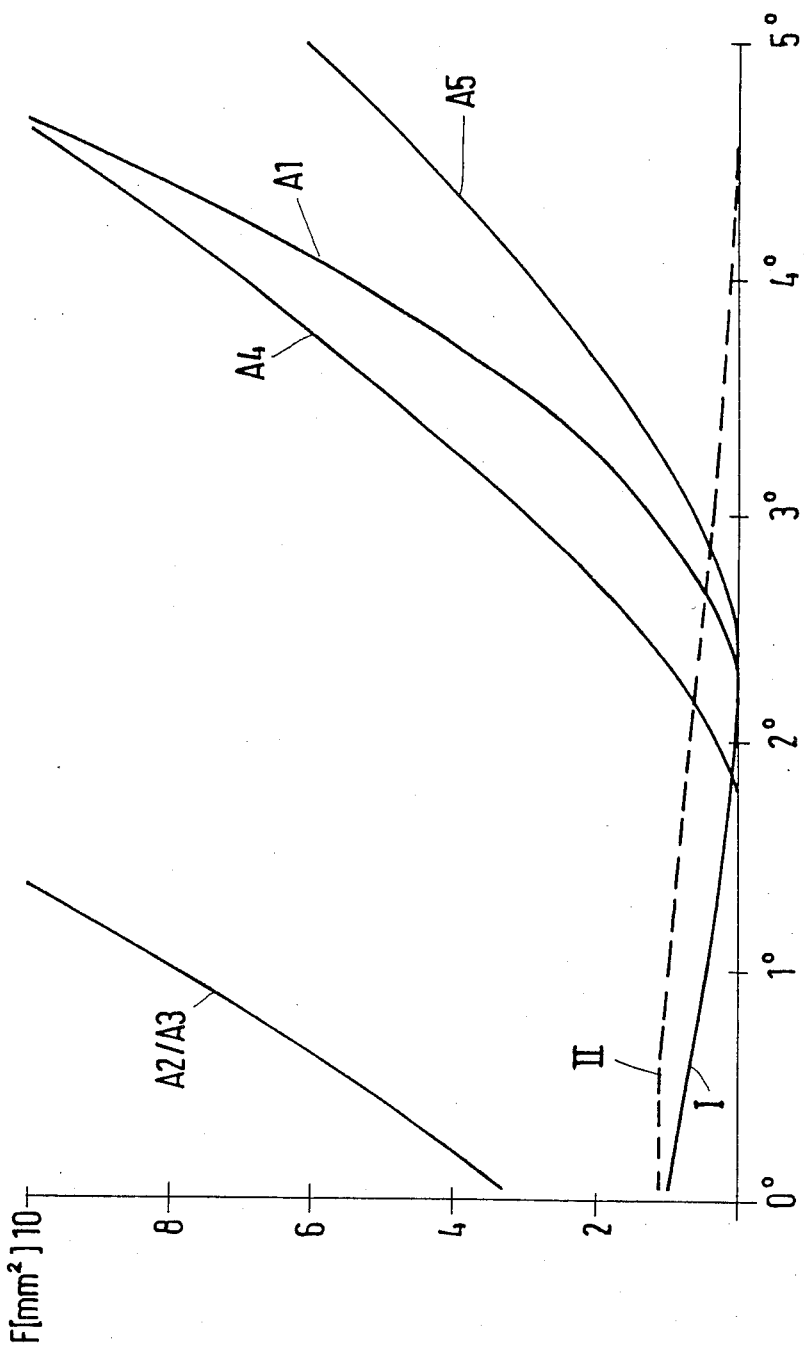

A preferred example of the invention will now be described in more detail with reference to the drawing, wherein:

FIG. 1 is a diagramatic representation of a control device that is to be improved in accordance with the invention, FIG. 2 is a longitudinal section through a control device according to the invention, FIG. 3 is a part-sectional plan view through the outer sleeve of the rotary slide arrangement, FIG. 4 is a section on the line A—A in FIG. 3, FIG. 5 is a section on the line B—B in FIG. 3, FIG. 6 is a development of the outer circumference of the outer sleeve, FIG. 7 is a development of the outer circumference of the inner sleeve, and FIG. 8 is a graph of the opening surfaces of the throttles against the turning angle.

FIG. 1 diagramatically illustrates a control device 1 for actuating a steering motor 2 which is connected to two steering motor connections R and L. A connection P on the pump side is connected to a pump 4 by way of a check valve 2' and the CF connection of a priority valve 3. A connection T on the container side is connected to a container 5. A rotary slide valve arrangement contained in the control device 1 is influenced on the one hand by a steering wheel 6 and on the other hand by a metering motor 7. A total of five throttles is provided in the path of main flow, namely the throttles A1 to A4 in the supply to the steering motor 2 and the throttle 5 in the return. The multiplicity of throttles is necessary because throttling is to take place in the supply as well as the return, because the motor connections R and L are connected to the connection P on the pump side depending on the direction of rotation of the steering wheel 6, and because the direction of throughflow of the liquid flowing to the steering motor 2 through the metering motor 7 must also take place in dependance on the direction of rotation. The throttles A1, A4 and A5 are closed in the neutral position. To this extent, we are concerned with a 'closed-centre, non-reaction' steering unit. A load pressure conduit 9 branches off at a point 8 behind the first throttle A1. A pressure signal LS is derived from the load pressure conduit 9 and, in operation of the steering motor, corresponds to the load pressure. The load pressure is limited to a maximum value with the aid of an overflow valve 10 and, on the one hand controls a setting device 11 of the pump 4 which, for example, has a variable compression to adapt the pump output to requirements, and on the other hand is supplied to a pressure chamber 12 of the priority valve 3. Together with a spring 13, the load pressure here acts on a slide 14 of which the opposite end is impinged by the inlet pressure PP in the pressure chamber 15. The inlet pressure therefore so follows the load pressure LS that the amount of throughflow substantially only depends on the opening width of the throttle A1 but not on the load pressure. Additional consumers can be connected by way of the outlet EF of the priority valve 3.

Between the point 8 and the connection T on the container side, there is a relief throttle 16 which is open in the neutral position but otherwise closed. It ensures that the load pressure LS immediately drops to the container pressure when the control device reaches the neutral position.

Between the connection P on the pump side and the connection T on the container side, there is a bypass throttle 17 which opens in the neutral position but is otherwise closed. When the control device assumes the neutral position, a predetermined small amount of warm pressure fluid which keeps the control device at an elevated temperature flows through the bypass throttle 17. The actual amount depends upon the throttling resistance of the bypass throttle and the inlet pressure PP which cannot be higher than the force of the spring 13 in the priority valve 3.

One embodiment of the invention is shown in more detail in FIGS. 2 to 7. The control device 1 comprises a housing 18 with fitted metering motor 7 and an end plate 20. The connection P on the pump side and the connection T on the container side are provided at the top. The steering motor connections R and L are only indicated. The metering motor 7 consists of a stationary gear ring 21 having internal teeth and a rotating and planetating gear 22 having external teeth, provided between the compression chambers 23.

A rotary slide valve arrangement 25 is disposed in a housing bore 24. This bore contains next to each other an annular groove 26 connected to the connection T on the container side, an annular groove 27 connected to the one steering motor connection L, an annular groove 28 connected to the other steering motor connection R, a series of control orifices 29 each connected to a compression chamber 23 by way of an axial passage 30, and an annular groove 31 connected to the pump connection P.

The valve arrangement 25 has an outer sleeve 32 and an inner sleeve 33. The outer sleeve 32 is fixed to rotate with the gear 22 of the metering motor 7, namely by way of a pin and a cardan shaft 34. The inner sleeve 33 is provided with a coupling 35 to connect to the steering wheel 6 and can therefore be connected thereto to rotate therewith. The two sleeves can be turned relatively to each other through a predetermined angle in both directions out of a neutral position against the force of radial leaf springs 36.

As shown particularly by FIGS. 3 and 6, the outer sleeve 32 comprises, from right to left, an annular groove 37 with bores 38, an annular groove 39 with bores 40, a series of bores 41, a double row of bores 42, a double row of bores 43, holes 44 for the passage of the pin for connecting to the cardan shaft 34, as well as connecting orifices 45.

As will be evident from FIGS. 2 and 7, the inner slide 33 has arranged therein from right to left short axial grooves 46 and longer axial grooves 47 which alternate in a row and are connected to an annular groove 48 from which further axial grooves 49 extend. They partially overlap with axial grooves 50 which are interconnected by an annular groove 51 and these overlap partially with axial grooves 52 of which some have an aperture 53 for the pin. Both sleeves also have incisions 54 and 55 for the leaf springs 36.

As will be evident by viewing FIGS. 6 and 7 together, the bores 40 and and axial grooves 46, 47, form the throttle A1, the axial grooves 49 in conjunction with every second bore 41 form the throttle A2, the axial grooves 50 in conjunction with the respective other bores 41 form the throttle A3, the axial grooves 50 depending on the direction of rotation together with the bores 42 or 43 form the throttle A4, and the axial grooves 52 in conjunction with the respective other bores 43 or 42 form the throttle A5. The bores 40 communicate with the connection P on the pump side by way of the annular groove 31. The bores 41, of which there are twice the number than there are teeth on the gear 22, together with the control orifices 29, of which there are as many as there are teeth on the gear ring 21, form a distributing valve for the metering motor 7. The bores 42 and 43 communicate with a respective steering motor connection R and L. The axial grooves 52 by way of a gap 55 provided at this position between the sleeves and the connecting orifices 45 are connected to the connection T on the container side.

The bypass throttle 17 is contructed as follows. At the periphery of the inner sleeve 33 there is a first axial control groove 56 and, circumferentially adjacent thereto, there is a second axial control groove 57 in the form of a throughgoing slot. They are interconnected in the neutral position by a bridging space 58 in the form of an oblique blind bore. The first control groove 56 projects into a web 59 between a shorter axial groove 46 and a longer axial groove 47. Here, it communicates with a bore 40 for connection to the inlet pressure PP. The second control groove 57 axially overlaps the first control groove and is provided as an extension of the shorter axial groove 46. No additional space is therefore required for the stated components. Only a small portion of the cross-section of the bridging space 58 covers the control groove 56 and another small portion of its cross-section covers the control groove 57. Consequently, one obtains two throttling positions generating little noise. Turning through a small angle only a little larger than two degrees will be sufficient to disengage the bridging space 58 fully from one of the two control grooves 56 and 57 and thus to close the bypass throttle 17. To produce the relief throttle 16, the outer circumference of the inner sleeve 33 is provided with an axial groove 60 in the form of a throughgoing slot and the inner circumference of the outer sleeve 22 is provided with a bridging space 61 in the form of an obliquely drilled blind hole. Since it is important for the relief bore to keep the throttling resistance as low as possible, that is to say to obtain rapid venting, three of the aforesaid constructions are provided at the periphery. All the bridging spaces are disposed substantially below the annular groove 37.

FIG. 8 shows the area F of the individual throttles against the turning angle. The neutral positon is at the angle zero. The throttles A2 and A3 formed by the control orifices for the metering motor are permanently open. After an angle of about 2 degrees, the throttle A4 opens. The throttles A1 and A5 follow. The curve I shows the course of the bypass throttle 17. It is therefore already closed at an angle of about 2.25 degrees when the throttle A1 just starts to open. By way of comparison, the curve II shows the known bypass throttle which only closes at an angle of 4.8 degrees.

Altogether, one therefore obtains a control device in which the bypass throttle can be produced more accurately than hitherto, is already closed at a smaller turning angle and greatly surpresses noise. The blind bore can be produced with a drill of larger diameter than was hitherto the case.

Instead of the illustrated 'non-reaction' steering unit, one may also employ a 'reaction' steering unit in which the two motor connections R and L are interconnected in the neutral position.

I claim:

1. A control device for a hydrostatic steering motor, comprising, supply and return pump and tank connections for said device, a slide valve arrangement in which inner and outer slide element sleeves are rotatable relative to each other to both sides of a neutral position through a limited small angle, said sleeves mutually forming controlled supply and return passages connected to said motor having supply and return throttles which are closed when said sleeves are in a neutral position, bypass throttle means between said pump and tank connections being open when said sleeves are in a neutral position, said bypass throttle means having two circumferentially offset throttle positions formed by two circumferentially offset axially extending bypass throttle grooves in one of said elements and a bridging recess in the other of said elements.

2. A control device according to claim 1 wherein said bypass throttle grooves are formed in the periphery of said inner sleeve, said supply throttle being formed by a set of axially extending grooves in said inner sleeve and a set of cooperating circumferentially spaced bores in said outer sleeve, said set of grooves having separating web sections therebetween, one of said throttle grooves being formed as a recess at one end of said inner sleeve and the other of said throttle grooves being formed within the surface confines of one of said web sections.

3. A control device according to claim 2 wherein the interior of said inner sleeve has fluid communication with said tank connection, said first one of said throttle grooves being formed as an end slot which extends between the inner and outer surfaces of said inner sleeve.

4. A control device according to claim 2 including a load pressure conduit branching off behind said supply throttle and being formed as an annular groove in the periphery of said outer sleeve, said supply throttle grooves comprising alternately arranged longer and shorter grooves, bores in said outer sleeve providing fluid communication between said annular groove and said longer supply throttle grooves, said one of said bypass throttle grooves extending between said longer grooves and said bridging recess being interiorly of and axially aligned with said annular groove.

5. A control device according to claim 4 including relief throttle passage means between said load pressure conduit and said tank connection, said relief throttle passage means including groove means in the periphery of said inner sleeve alternately between and in axially overlapping relation to said supply throttle longer grooves, said relief throttle groove means and said supply throttle longer grooves being interconnected in said neutral position by a bridging recess in the inner surface of said outer sleeve.

6. A control device according to claim 1 wherein said bypass throttle grooves are in axially overlapping relation to each other.

* * * * *